April 24, 1962

W. M. McCONNELL 3,030,901

MEANS AND METHOD FOR EXPANDING AND TESTING PIPE

Filed Aug. 30, 1955

INVENTOR.
William M. McConnell

BY Webb, Mackey & Burden

HIS ATTORNEYS

Fig. 2

INVENTOR.
William M. McConnell

INVENTOR.
William M. McConnell

April 24, 1962 W. M. McCONNELL 3,030,901
MEANS AND METHOD FOR EXPANDING AND TESTING PIPE
Filed Aug. 30, 1955 7 Sheets-Sheet 6

INVENTOR.
William M. McConnell
BY
Webb, Mackey & Burden
HIS ATTORNEYS

United States Patent Office 3,030,901
Patented Apr. 24, 1962

3,030,901
MEANS AND METHOD FOR EXPANDING
AND TESTING PIPE
William M. McConnell, McKeesport, Pa., assignor to
Taylor-Wilson Manufacturing Company, McKees
Rocks, Pa., a corporation of Pennsylvania
Filed Aug. 30, 1955, Ser. No. 531,543
13 Claims. (Cl. 113—44)

This invention relates to a means and a method for expanding and testing pipe and, more particularly, relates to the hydraulic expansion of a one-piece metal pipe in successive sealed sections and, finally, to the single stage testing of the overall piece of thus-expanded pipe for observation for hydraulic leakage.

In the past, hydraulic expansion and testing of pipe has proved generally expensive by reason of the large size and complexity of the apparatus known and used for the purpose of expanding the pipe. Still, expanded steel pipe, for instance, has generally justified itself commercially in various instances compared to unexpanded pipe, due to the larger inside diameter and carrying capacity of the former and due to its increased strength resulting from the cold working of the molecular crystals of the metal during the radial expansion of the walls of the pipe. To produce suitable pipe expansion by hitherto known hydraulic apparatus requires end plugs at the extreme opposite ends of the pipe, requires a confining die coextensive in length with the pipe, and further requires a high pressure, high capacity source of hydraulic fluid for internally pressurizing the entire length of plugged pipe in one operation to expand it outwardly against the full length of the confining die. Expansion apparatus suitable for expanding pieces of gas carrying pipe, for instance, having a size of upwards of 20 inches in diameter and of 50–60 feet in length, becomes nearly prohibitive in cost, whereas expansion apparatus suitable for relatively smaller pieces of pipe are inordinately high and burdensome from the standpoint of capital expenditure and maintenance.

It is an object of the present invention to provide a pipe expansion method and apparatus which internally expands adjacent sections of the same piece of pipe at different successive times in a manner to progress in steps internally from one end of elongate pipe to the other, thereby permitting successive uses of die and hydraulic expansion equipment considerably smaller in size and less expensive than prior equipment necessary to be used with the full length type pipe expanding apparatus of the foregoing paragraph.

It is a further object of the invention to provide a short length hydraulic plug device which is sealed in a novel manner internally of adjacent sections of the pipe to cause them to expand section by section under hydraulic pressure. The walls of the pipe expand until they solidly engage a short length, surrounding mantle unit. This method of so sealing individual sections of the same piece of pipe and expanding each section individually against the same solid mantle unit while sealed forms another feature of the present invention.

Further features, objects, and advantages of the present invention will either be specifically pointed out or become apparent when, for a better understanding of the invention, reference is made to the following description taken in conjunction with the accompanying drawings, in which in general.

Figure 1A:
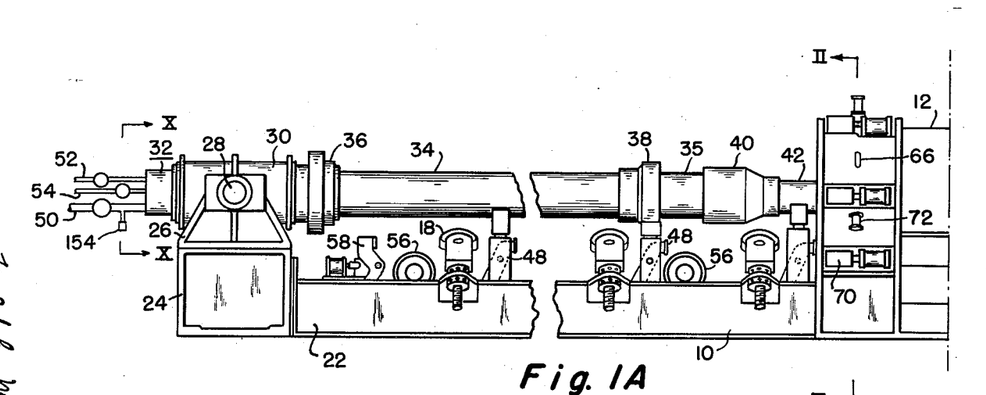
FIGURES 1A and 1B are side elevational views of the extended length of the present apparatus divided in two parts.
Figure 1B:
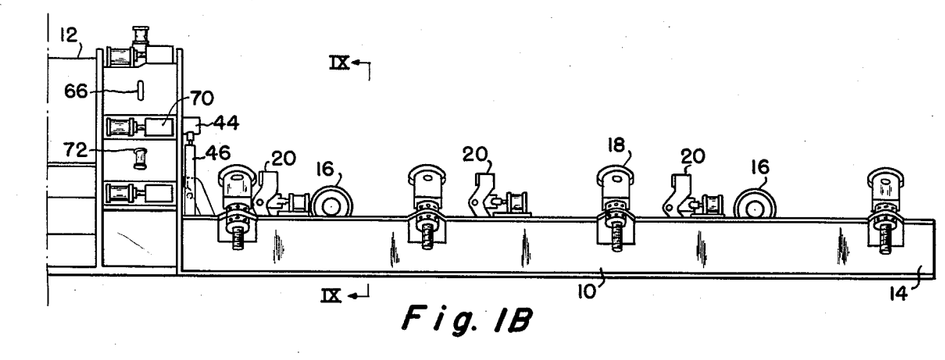

In more particular reference to FIGURES 1A and 1B of the drawings the present apparatus includes a bed or base 10 which may comprise a framework of welded-together I-beams adapted to rest on a load supporting surface such as a reinforced concrete floor or bed, not shown. Intermediate the opposite ends of the base 10, the apparatus includes an upstanding hydraulic expansion section 12 for expanding pipe, and toward the right-hand end portion of the base 10 at 14, a piece of pipe to be expanded is entered and advanced onto the framework. The advancing pipe is driven by means of a series of aligned power driven feed rollers 16 and is centered in the vertical plane of the feed rollers 16 by means of a diagonally aligned series of opposed side rollers 18. Suitable hydraulically actuated stops 20 for the right end of the piece of pipe being advanced are located between the driving feed rollers 16 for holding the pipe stationary between successive stages of advancement toward the left. At the opposite end portion 22 of the base 10, an upstanding standard 24 is provided having a pair of spaced apart trunnion bearing pedestals 26 supported thereby. The trunnion bearing pedestals 26 receive the transversely extending pair of horizontal trunnions 28 carried by a heavy steel cylindrical band 30. The cylindrical band 30 supports a combined expansion and leak testing member 32 of tubular, mandrel-like construction having a hydraulic leak testing section 34 intermediate the ends of a tubular portion 35 and defined by means of a pair of spaced apart spool structures 36, 38 which are spaced apart a distance equal to the length of the piece of pipe being tested. The tubular portion 35 has a reducing fitting 40 at its outer end by means of which it rigidly carries another tubular portion 42 of relatively reduced or smaller diameter provided with a spool plug 44 at its end and together therewith forming a longitudinal extension of said member 32. A combined stop and hydraulic jack 46 supports the spool plug 44 and further combined hydraulic jacks and stops at 48 support the intermediate portions of the smaller tubular portion 42 and the larger tubular portion 35. The tubular portions of the member 32 are swingable vertically upwardly and downwardly as a unit about the horizontal trunnions 28 as a center and the hydraulic jacks 46 and 48 support the tubular portions in horizontal position. The spool plug 44 is supplied with fluid under pressure, preferably water, through one of two valve controlled lower conduits 50, and the leak testing section 34 is supplied with the same composition of fluid through a separate connection behind the conduit 50. In addition, the plug 44 and the leak testing section 34 are served through individual air bleed lines at 52 which are valve controlled so as to conduct away air displaced by the water entering through the conduits 50. A centrally located water supply conduit 54 is provided which is valve controlled and additionally supplies fluid to the plug 44 for the purposes hereinafter described.

The pipe to be expanded and tested, not shown in FIGURES 1A and 1B, is advanced from the right end portion 14 of the present apparatus through the hydraulic expansion section 12 in successive stages and thereafter is conducted by means of a further set of power driven feed rollers 56 to a position satisfactory to be sealed by means of the spool structures 36, 38 for testing for leaks. One or more stops 58, as necessary, which are hydraulically actuated, are provided for the left end of the pipe, similar to the stops 20 in FIGURE 1B provided for the right end of the pipe as it is progressively advanced through the apparatus. The pipe itself is shown in FIGURE 2 in a transverse sectional view taken through the hydraulic expansion section 12 of the present apparatus.

Figure 2:
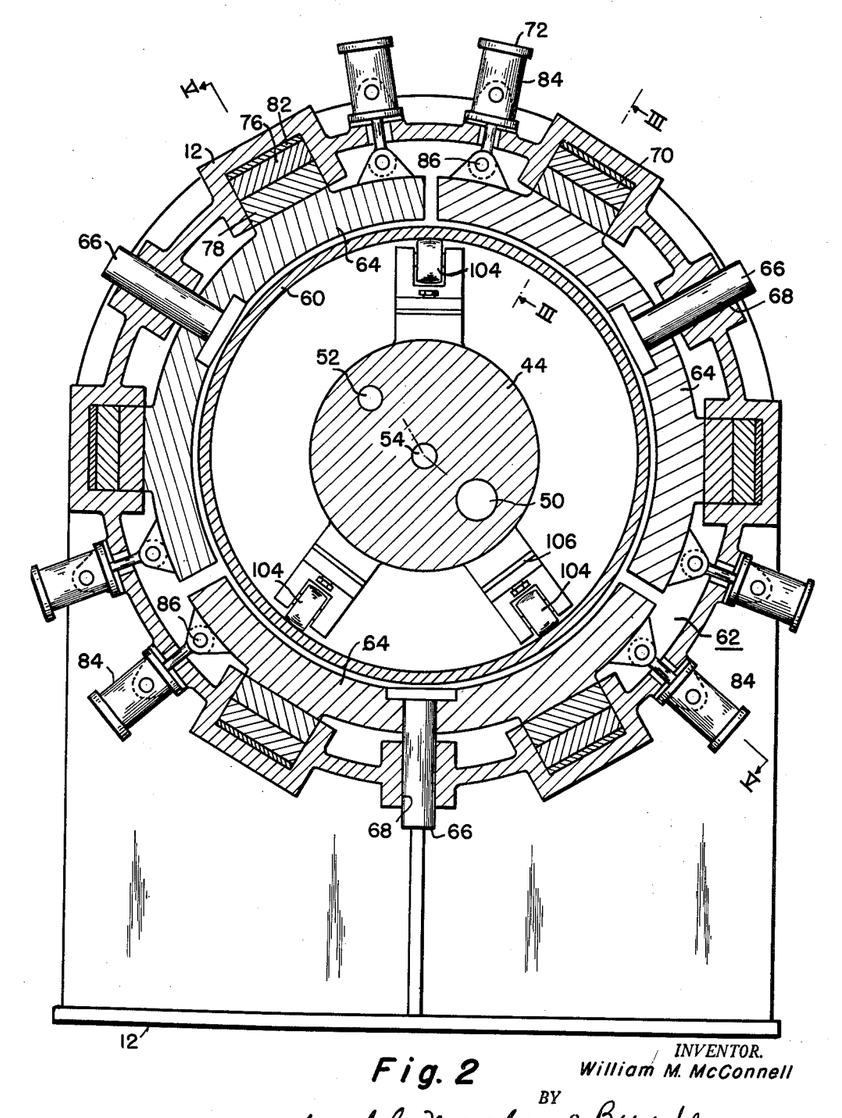
FIGURE 2 is a transverse sectional view taken along the lines II—II of FIGURE 1A.

In FIGURE 2, a piece of pipe 60 to be expanded is internally received within a die or mantle unit 62 formed of three separate complemental shoes 64, each having an arcuate width of 120 degrees more or less and a length equal to the length of the section 12. Each of the mantle shoes 64 has a pin 66 at each end thereof rigid with the adjacent end and protruding through a slide opening 68 in the side of the hydraulic expansion section 12 so as to guide the ends of the shoe radially inwardly and outwardly in the section 12. The hydraulic spool plug 44 is shiftably received within the pipe 60 and a plurality of hydraulically actuated wedge devices 70 and hydraulic retraction and advancing devices 72 appear on the outside and at the respective ends of the shoes 64, all as more particularly hereinafter described in the succeeding FIGURES 3, 4, and 5.

Figure 3:
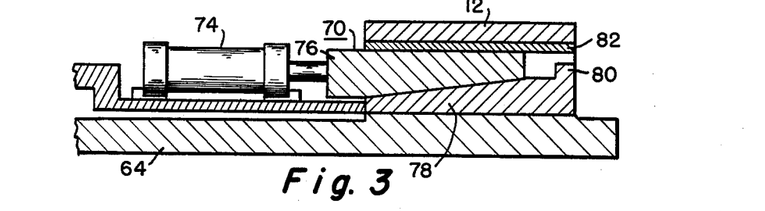
FIGURE 3 is a section taken along the lines III—III of FIGURE 2.

In FIGURE 3, the hydraulic wedge devices 70 have a power actuator therefor comprising a double acting hydraulic cylinder 74 having a piston rod rigidly drivingly connected to a longitudinally shiftable wedge 76 slidably related to a companion radially shiftable inner wedge 78. The wedge 78 has a stop 80 at its outer end to limit overlapping motion of the wedges 76, 78 to a predetermined amount. The case of the hydraulic expansion section 12 has a stationary wedge guide 82 along its inner surface against which the hydraulically actuated wedge 76 slides. The radially shiftable wedge 78 presses directly against the adjacent end portion of the shoe 64 of the mantle for the pipe. Advancement of the piston rod from the double acting cylinder 74 causes the shoe 64 to be advanced radially inwardly along its guide pins 66 to a predetermined position closely spaced to the pipe 60 to be expanded. At least two hydraulic wedge devices 70 are provided for each end of each shoe 64.

Figure 4:
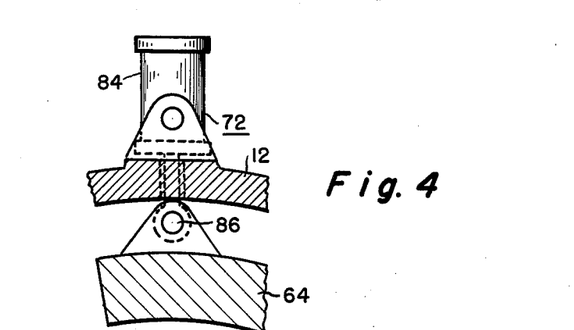
FIGURE 4 is a fragmentary enlargement of a portion of FIGURE 2.

In FIGURE 4, a typical hydraulic advancing and retracting device 72 for the shoes 64 is shown. The hydraulic device 72 includes a double acting cylinder 84 swingably mounted to a stationary bracket carried by the case 12 and having the piston rod thereof connected by means of a pivot joint 86 to the adjacent end of the shoe 64 so as to move it radially inwardly and outwardly with respect to the casing of the hydraulic expansion section 12. The hydraulic advancing and retracting devices 72 are used in conjunction with the wedge devices 70 at the opposite ends of the shoes 64 so as to advance the shoes preparatory to the locking operation of the wedge devices and so as to retract the shoes as soon as the wedge devices have been retracted.

Figure 5:
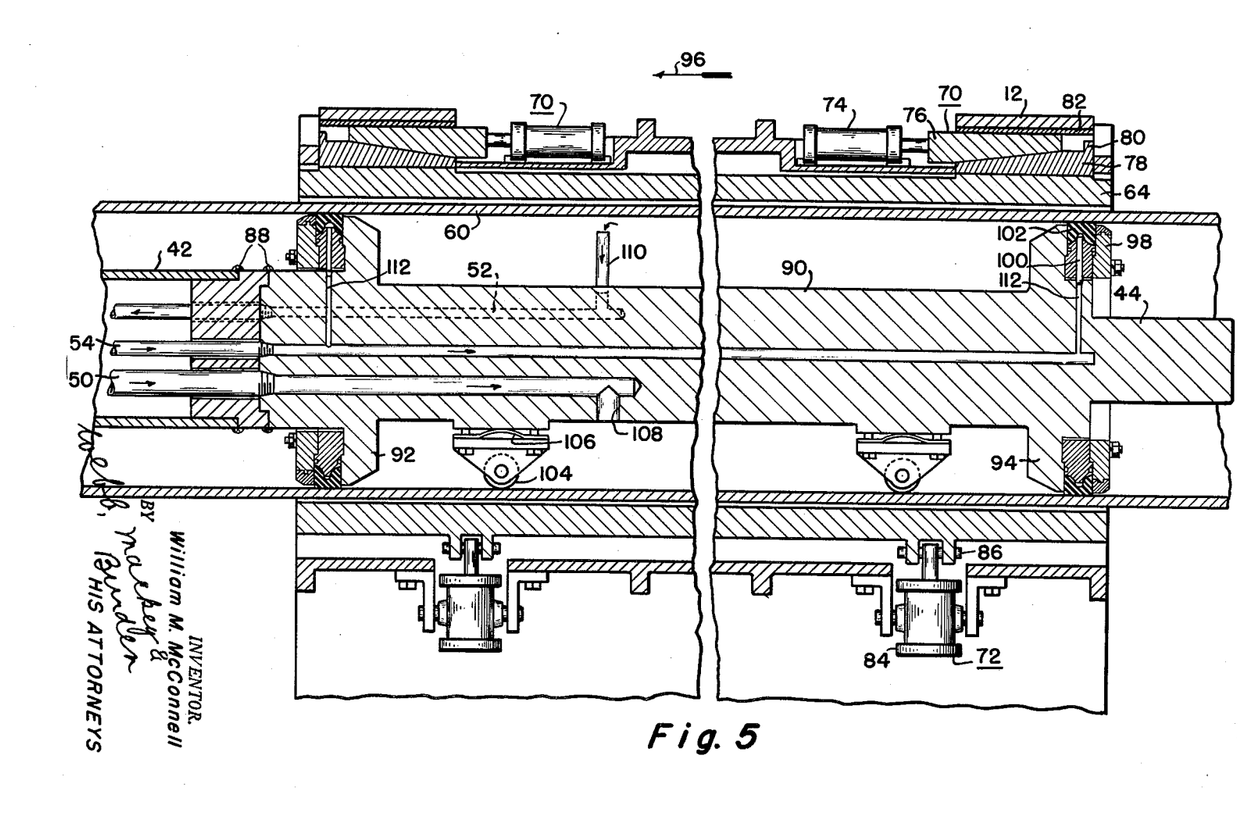
FIGURE 5 is a longitudinal sectional view taken along the lines V—V of FIGURE 2.
Figure 11:
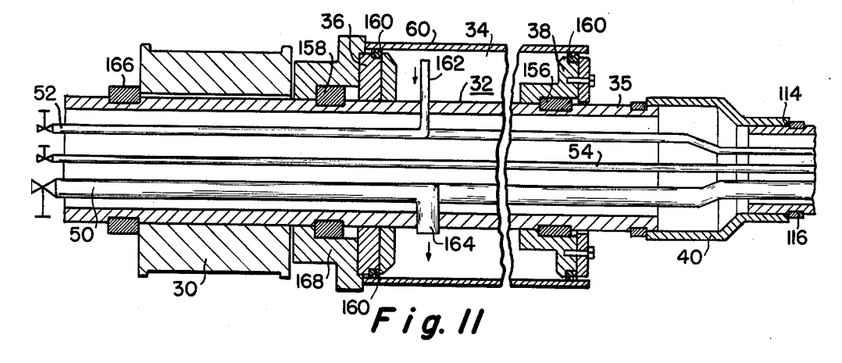
FIGURE 11 is a longitudinal sectional view taken along the lines XI—XI of FIGURE 10.

In FIGURE 5, the spool plug 44 is carried at the smaller diametered tubular portion 42 of the member 32 and may be secured thereto as by means of welding at 88, or otherwise. The plug 44 has a midportion 90 of relatively reduced diameter in comparison to its opposite spool type flanged end portions 92 and 94, but being at least approximately one-half of the diameters of the latter in order to reduce the end area thereof exposed to the separative action and end thrust of the trapped hydraulic fluid therebetween. Relative to the piece of oncoming pipe 60 which is advanced in sections from the right and in the direction of the arrow 96, the spool portion 94 forms the anterior portion of the spool plug 90 and the spool portion 92 becomes the posterior spool portion thereof. Each of the spool portions includes a seal backing plate 98 which clamps a seal inflating ring member 100 and a seal 102 to the spool portion 92 or 94. The reduced midportion 90 of the spool type plug 44 is supported by biased suspension means consisting of sets of longitudinally spaced apart rollers 104 which are spring urged at 106 outwardly into engagement with the inner surface of the pipe 60. Preferably, three sets of circumferentially spaced apart series of rollers 104 are provided to insure accurate centering and spacing of the spool plug 44 centrally and coaxially of the pipe 60. The midportion 90 has a relatively high pressure downwardly directed water conduit outlet 108 connected to the lower water conduit 50 and an upstanding air return spout 110 connected to the air bleed conduit 52 such that air trapped in the chamber between the reduced portion of the plug 90 and the inner surface of the pipe 60 may readily be displaced by the incoming high pressure water through the conduit 50. The seal inflating ring members 100 for the seals 102 are supplied through a relatively higher pressure outlet 112 which is connected to the central water conduit 54. The tubular portion 42 of relatively reduced diameter in the member 32 is connected to the reducing fitting 40 therein by suitable means such as welding at 114 (FIG. 11), and a steel band type snap ring 116 may be provided within a groove in the surface of the tubular portion 42 so as to abut against and prevent relative movement of the reducing fitting 40 relative thereto (FIG. 11). It is within the contemplation of the present invention that the seal 102 be internally pressurized or inflated at a slightly greater pressure than the pressure maintained in the outlet 108 between the plug 44 and the interior of the pipe 60. The specific structure of the seals 102 and the seal backing plates 98 is more particularly shown in FIGURES 6, 7, and 8 described as follows.

Figure 6:
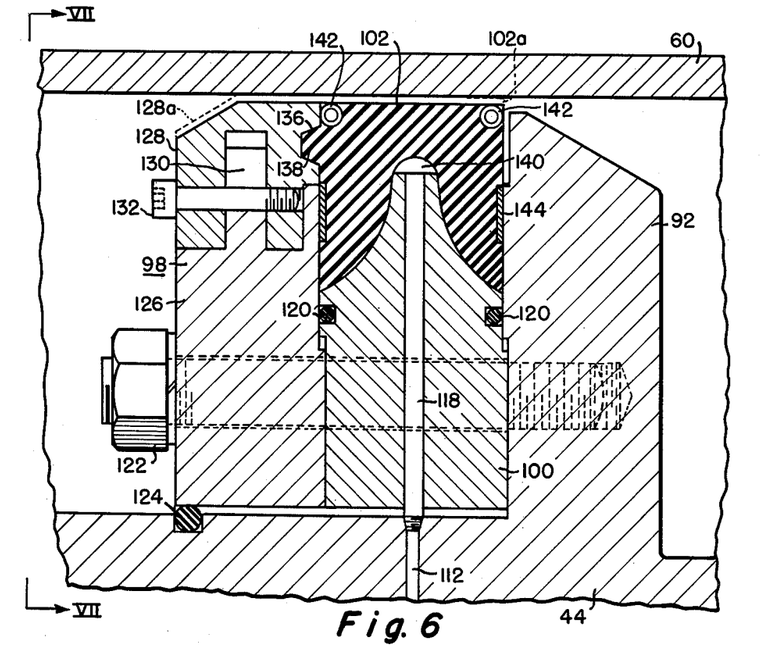
FIGURE 6 is an enlarged fragmentary showing of a portion of the structure of FIGURE 5.
Figures 7, 8:
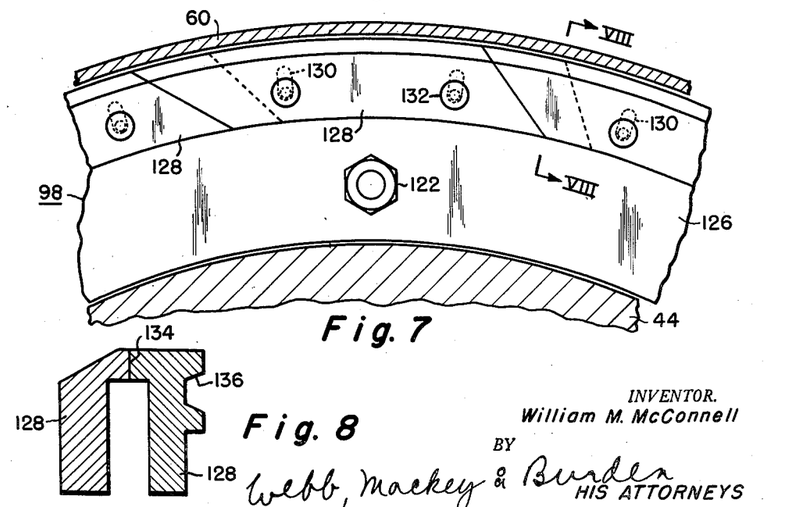
FIGURE 7 is an end elevational view taken from the lines VII—VII of FIGURE 6.
FIGURE 8 is a fragmentary sectional view taken along the lines VIII—VIII of FIGURE 7.

In FIGURES 6, 7, and 8, the seal inflating ring member 100 for each of the seals 102 contains one or more radially extending passages 118 communicating at their inner ends with the higher pressure passage 112 used for conducting inflating fluid such as water to the seal 102. The seal inflating ring member 100 is suitably sealed at its opposite sides at 120 and is clamped between the adjacent spool portion 92 and the seal backing plate 98 by means of a suitable stud and nut fastener 122. Another seal at 124 is disposed in an annular groove formed in the plug 44 and engages the inner circumference of the seal backing plate 98 which comprises a central ring element 126 and a plurality of segmental radially shiftable elements 128. The central ring element 126 is stationary and has a radial flange at its periphery provided with a plurality of radially outwardly extending slots 130 which are slightly oversize in width and within which a bolt 132 is loosely slidably received. Two of the bolts 132 are provided and secured to each of the shiftable segment elements 128, which latter, in one contemplated embodiment of the invention, are provided in the number of approximately 35 for each one of the ring elements 126. The radially inwardly and outwardly shiftable segment elements 128 are complementally beveled at their opposite ends so as to diagonally overlap with each one of the adjacent two segment elements at the respective ends of the latter along diagonal slide interfaces illustrated at 134, FIGURE 8. In their movement radially, the shiftable segment elements 128 may be moved outwardly into a position at 128a, FIGURE 6, adjacent the inner wall of the pipe 60. Inwardly and outwardly shiftable movement of the segment elements 128 in the restrained radial path defined by the bolts and slots 132, 130 is caused due to a connection between an annular groove 136 formed in each segment 128 and an annular rib or protrusion 138 formed on each seal 102 at the adjacent side thereof. In operation, when the passages 112, 118 are pressurized with higher pressure fluid, an included annular chamber 140 between the seal 102 and the seal inflating ring member 100 is internally pressurized so as to expand the outer peripheral portion of the seal 102 into a forced sealing position 102a engaging the inner surface of the pipe 60. Suitable garter spring reinforcements 142 are provided in the opposite ends of the periphery of the seal 102 and suitable reinforcing rings 144 are bonded to the inner periphery of the seals 102 which are non-metallic and may be formed of rubber or other deformable elastomeric material. Conjoint movement of the segment element 128 with the seals 102 due to the inflation of the latter blocks and prevents extrusion of the internally and externally reinforced seal 102 past the backing plate 98 when the plug 44 is hydraulically pressurized within the pipe 60.

Figure 9:
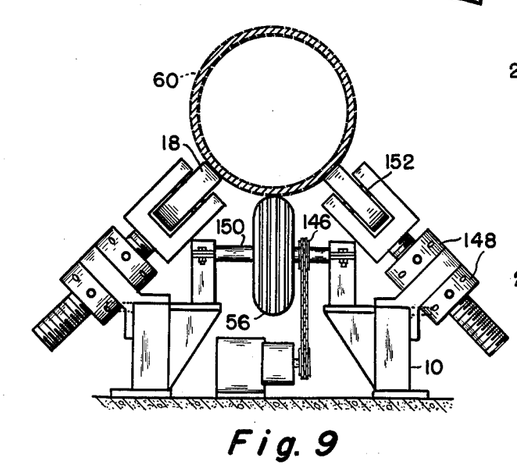
FIGURE 9 is a transverse sectional view taken along the lines IX—IX of FIGURE 1B.

In FIGURE 9, the coactive relationship between the side rollers 18 and the driving feed rollers 56 is illustrated. The driving feed rollers 56 are suitably driven as by means of a motor driven chain and sprocket 146 to advance the pipe 60 axially in successive stages along the apparatus and the side rollers 18 are rendered adjustable by means of lock nuts 148 in order to adjust for and keep the particular size of pipe 60 centered upon but in contact with the drive feed rollers 56. The drive feed rollers 56 are carried for rotation on a bearing supported shaft 150 and the side rollers 18 are carried for rotation on short shafts 152 in bifurcated threaded studs anchored to the base 10 by the lock nuts 148.

Figure 10:
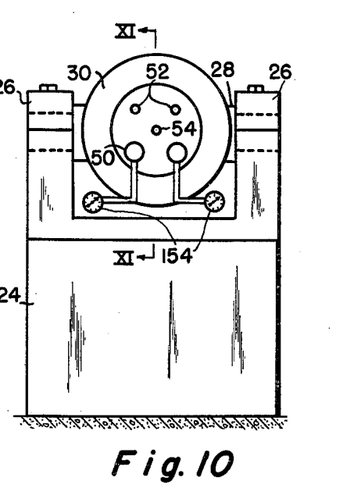
FIGURE 10 is a transverse sectional view taken along the lines X—X of FIGURE 1A.

In FIGURE 10, the standard 24 and the upstanding bearing pedestals 26 are shown in their end view relationship of providing support to the trunnions 28 and the heavy cylindrical band 30 for the present apparatus. The high pressure water conduits 50 are shown to include a pair of fittings 154 suitable for receiving pressure gauges. The higher pressure conduit 54 is shown centrally located with respect to the band 30 and the smaller upper air return conduits are shown at 52. As has been hereinabove noted, one of the smaller air return conduits 52 is used for returning trapped air from the leak testing section of the present apparatus which is more particularly shown in FIGURE 11.

In FIGURE 11, the leak testing apparatus includes the anterior and posterior spaced apart spool portions 38 and 36, over which a fully expanded full length piece of pipe 60 is adapted to be received. The spool portions 36, 38 are located at the ends of the section 34 of the tubular portion 35 and are keyed thereto as by means of steel band snap rings 156 and 158. Each of the spool end portions carries a seal 160 which engages the inner periphery of the ends of the pipe 60. In the space defined between the spool portions 36, 38 and the interior of the pipe 60, an upstanding air return spout 162 is disposed so as to protrude upwardly to collect trapped air, and is communicatively connected to the air return conduit 52. A downwardly extending water inlet discharge 164 is connected to the water pressure conduit 50. The tubular portion 35 may be keyed by means of a steel band snap ring 166 to the end of the cylindrical trunnion carrying band 30. A spacer 168 which engages the snap ring 158 is disposed between the posterior spool portion 36 and the band 30.

Figure 12:
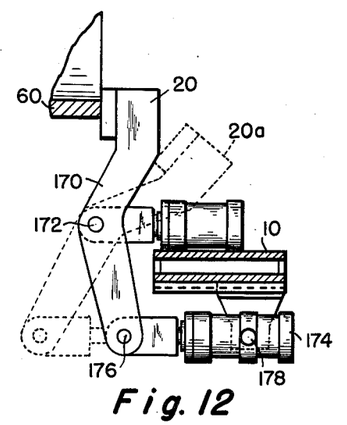
FIGURES 12 and 13 are fragmentary enlargements of the respective stops of FIGURES 1B and 1A, respectively.

In FIGURE 12, one of the end clamps or stops 20 for clamping the right end of the piece of pipe 60 being advanced is shown in detail. The stop 20 is carried at the outer end of a rocking lever 170 which is stationarily pivoted for swinging movement at 172 about its midportion. The pivot 172 is fixed to the base 10 of the present apparatus. A double acting hydraulic cylinder 174 is pivotally connected at 176 to the opposite end of the rocking lever 170 so as to swing the stop end 20 thereof between the solid line position shown in FIGURE 12 and the dotted line position 20a which is out of the path of movement of the pipe 60. The double acting hydraulic motor is pivotally supported for swinging movement at 178 to the base 10 of the apparatus.

Figure 13:
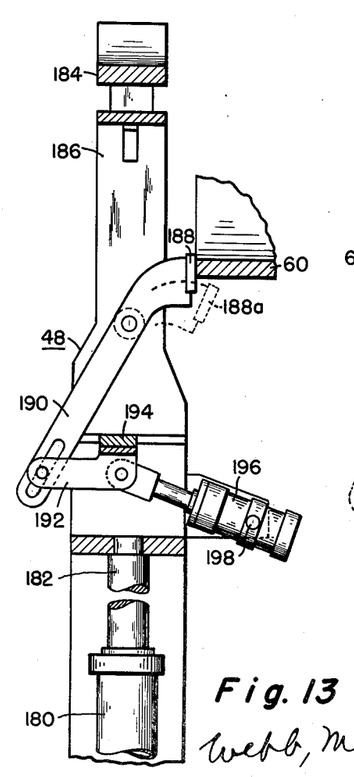

In FIGURE 13, the combined hydraulic jacks and stops 48 are more particularly shown in detail. The hydraulic jack portion thereof includes a cylinder 180 from which a piston rod 182 is vertically extended so as to force a jack portion 184 upwardly into engagement with the trunnion supported elongated member 32 of the present apparatus. As indicated, these jacks cooperate in load-sharing relationship to pivot the member 32 up and down on its trunnion axis into its properly aligned position. The jack portion 184 is slidably mounted within a stationary vertical standard 186 which also pivotally carries an end clamp or stop 188 for engagement with the left end of the pipe 60 being advanced on the apparatus. The stop 188 is formed at one end of a rocking lever 190 which has a pin and slot connection to a cross head arm 192 slidably mounted at 194 for horizontal travel with respect to the standard 186. The cross head arm 192 is pivotally connected to the piston rod of a double acting hydraulic cylinder 196 which is pivoted at 198 to the standard 186. Retractive movement of the piston rod by the cylinder 196 causes the cross head arm 192 to undergo a rectilinear motion which, in turn, rocks the lever 190 so as to position the stop 188 upwardly into the solid line position of engagement with the left end of the pipe 60. Full advancement of the piston rod by the cylinder 196 causes the stop 188 to be rocked downwardly to the dotted line position 188a out of the path of the piece of pipe 60.

Figure 14:
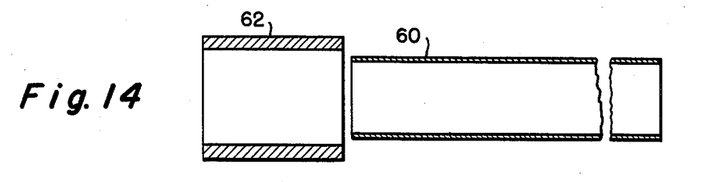
FIGURES 14–18 are sequential views showing progressive steps of expansion of a piece of pipe in the present apparatus.
Figure 15:
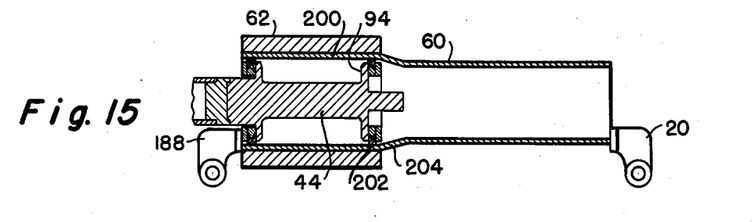

An understanding of the operation of the expansion section 12 of the present apparatus is best had from a consideration of sequential FIGURES 14, 15, 16, 17, and 18. In FIGURE 14, an unexpanded, untested piece of pipe 60 is shown entering the die or mantle 62 of the expansion section of the present apparatus. FIGURE 15 shows the right and left end stops 20, 188 clamping the pipe 60 at a position such that a leading or first section 200 thereof occupies the mantle 62 and is occupied by the spool plug 44. International pressurization of the pipe between the inner surface thereof and the plug 44 sealed thereto causes the first section at 200 to expand into engagement with the mantle 62 at least to the point at which the expanding seal on the anterior plug portion 94 engages the section 200 at 202. A resulting transition portion in the pipe occurs at 204 representing the difference in diameters between the expanded portions 200 and the uniform diameter of the unexpanded sections of the pipe 60.

A pressure gauge, not shown, is used at the fittings 154, FIGURE 10, as a means for determining when the expansion of a section is completed. As water is introduced into the passage 50 and it displaces all the air between the plug spool portions 92, 94, FIGURE 5, the valve controlled air return conduit 52 is closed and the gauge will register a decided and sudden increase in pressure. The section of the pipe under pressure will yield under stress above its elastic limit and the gauge will remain stationary or change very slowly. When the section expands into engagement with the die, the pressure gauge will again show a decided and sudden increase due to the solid resistance of the die wall and wedge devices 70. This latter sudden increase in pressure is an indication to the operator that the expanding operation is complete for that section, whereupon the water pressure is released.

Figure 16:
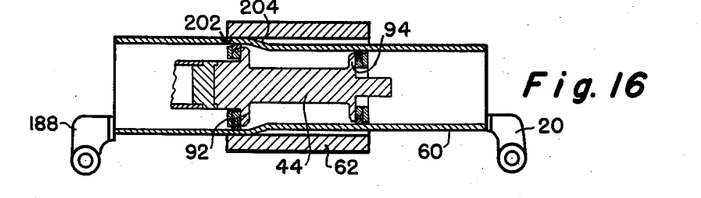

Advancement of another section of the pipe to within the mantle 62 is shown in FIGURE 16 in which a different set of the stops 20, 188 is employed. In this instance, the posterior plug portion 92 engages the portion 202 of the pipe formerly occupied by the anterior spool portion and the spaced apart spool portions 92, 94 straddle the transition section 204 in the pipe 60. Internal pressurization of the plug in FIGURE 16 causes another section of the pipe to be expanded with appropriate follow-up by the seal in the spool portion 94 and during such expansion, and each subsequent and prior expansion, the pipe 60 undergoes a local permanent foreshortening due to the increase in radius of the expanded section. The hydraulically actuated clamps or stops 20 and 188 tend continually to press the ends of the pipe together and to provide a suitable follow-up motion preventing longitudinal displacement of the pipe due to the small amount of foreshortening attendant with the expansion of each section.

Figure 17:
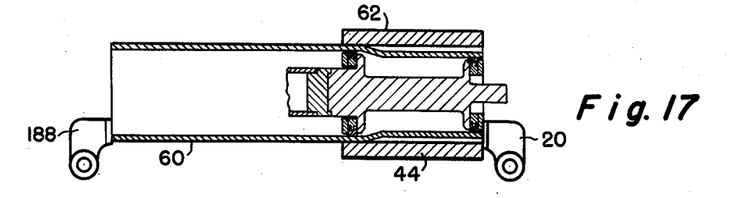

FIGURE 17 shows the plug 44 advanced into the last section of the pipe 60 immediately preparatory to the expanding of the last section. The sections of the pipe may be a submultiple of the length of the pipe or else a fractional portion thereof, depending upon the predetermined distance of the plug spool portions from one another relative to the full length of the pipe 60. It is of no particular difference whether the last section of the pipe expanded happens to be a full submultiple of the length of the pipe or only an irregular fractional portion of the full length of the plug.

Figure 18:
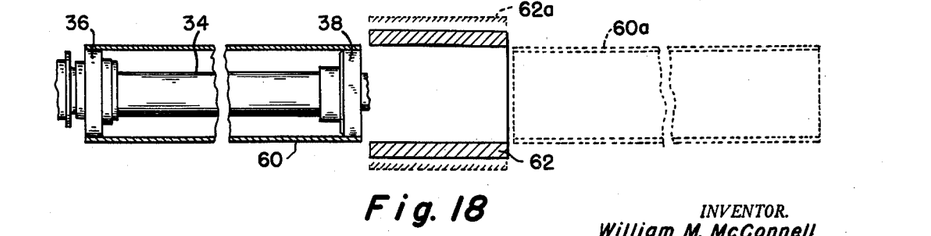

In FIGURE 18, the fully expanded piece of pipe 60 is shown leaving the mantle 62 for advancement onto the comparatively large-diameter, hydraulic leak testing spools described in connection with FIGURES 1 and 11. After suitable hydraulic testing at relatively lower pressures during which the entire piece of pipe is tested at one time owing to the fact that the testing spool portions are spaced apart a distance equal to the length of the pipe, the hydraulic devices 70, 72 are retracted and the mantle 62 is expanded to the open dotted line position 62a. Thereafter, the piece of expanded and tested pipe 60 is withdrawn to the right through the open mantle 62 from the solid line position of FIGURE 18 to the dotted line position 60a where it is removed from the expanding and testing apparatus.

It will be apparent from the foregoing description that through successive use of the expansion section 12 on individual sections of a long piece of pipe, the pipe may be expanded hydraulically throughout its full length, even though the expansion section 12 is only a small part of the entire length of the pipe. It is at once apparent that there is a resulting economy in length and die costs of the three-shoe mantle unit 62 which, therefore, may be relatively short and in fact is but a fractional part of the full length of the pipe and of the mandrel. It is manifest, in view of the fact that the leak testing apparatus requires a much lower operating pressure that the leak testing apparatus can be economically made of a size sufficient to test the entire piece of pipe at once. No confining die or mantle is necessary for the leak testing operation and is preferably absent in order to fully expose the bare pipe for visual inspection of the exterior for leaks.

Variations within the spirit and scope of the invention described are equally comprehended by the foregoing description.

I claim:

1. For use with a relatively short mantle having a bore the diameter of a finished pipe and larger than the initial diameter of a pipe to be expanded, combined means for expanding and hydraulically testing that pipe for leaks comprising an elongated member having a body portion of one diameter and an extreme end portion of a relatively smaller diameter, said body portion having sealed, spaced apart, leak testing spool structure means thereon, said extreme end portion having second, spaced apart sealed spool structure means thereon aligned in tandem with the leak testing structure means, means for coaxially introducing said pipe by successive sections over said second spool structure means in the direction of said body portion, high pressure means through which hydraulic working fluid is internally admitted in the sealed space between the second spool structure means and the successive sections of the pipe for hydraulically expanding each section to said larger diameter within said mantle, and lower pressure means through which hydraulic testing fluid is admitted in the sealed space between the leak testing spool structure means and the pipe when the latter has progressed to a position of reception upon the leak testing spool structure means.

2. Apparatus for hydraulically cold expanding and testing pipe comprising in combination an expander and tester mounting member receivable within the pipe, said member and said pipe being relatively movable in successive stages for telescopically interfitting with one another, means mounted to said member for locally internally stressing portions of said pipe for expanding the same to a larger diameter at successive stages along the length thereof, relatively short die means having said larger diameter for locally supporting the otherwise bare walls of correspondingly short sections of the pipe to limit the extent of pipe expansion to within the rupture limit of the pipe, and leak testing means mounted to said member for generally internally stressing the entire length of bare pipe following the total of the local expansions of the individual portions thereof.

3. In a method characterized by operating pipe by steps into a fully telescoped relation over a test member, said member having a short extension at the free end for plugging and expanding the passing portions of the pipe, the improvement comprising intermittently moving a length of the pipe in a unidirectional path beginning from a position of the pipe in a first period clamped at rest in which the front portion of the unexpanded pipe is introduced over the short extension and expanded, repeating said operation thereby advancing the initial and subsequent portions of the pipe into a progressively telescoping position surrounding the test member as each next portion is expanded, and then as a single unit upon its final advanced movement upon said member following expansion of the rear end portion, test pressurizing the expanded pipe length in situ prior to removal in order to locate leaks.

4. In apparatus of the character described, a bed, an elongated member having one end for attachment to said bed and having separate conduits therein for the passage of fluid therethrough, a plurality of hollow-seal-carrying spool means common to said member in a tandem arrangement in combination therewith to receive tubular parts to be expanded and tested on said member, means connecting the hollow interior of at least one of said seals and the space between it and the next spool means, to different ones of said conduits to maintain the former at separate pressures from one another, a split mantle mounted to said bed in a position to surround a part being expanded and operable for admitting said member into a horizontally aligned position, and means to pivot said member into the horizontally aligned position registering with said mantle.

5. In apparatus of the character described, an elongated member arranged lengthwise of the bed of said apparatus, a plurality of hollow-seal-carrying spool means common to said member in a tandem arrangement in combination therewith to receive tubular parts to be expanded and tested on said member in lengthwise moved positions thereon, means communicatively connected to the hollow interior of at least one seal and to the space between that seal and the next spool means to hold the seal at a higher pressure than the positive pressure held in said space, and a plurality of end clamps on said bed and individually engageable at different times to hold an individual tubular part in a plurality of endwise adjusted clamped positions on the bed of said apparatus.

6. Apparatus for hydraulically expanding metal pipe comprising plug and die members respectively within and without a common section of the pipe, said plug member comprising a unitary structure of fixed length of which the center section is relieved between its opposite end portions and through which center section a hydraulic pressure is introduced, and having inflatable end seals carried by the latter portions so as to swell radially into engagement with the pipe to form a sealed hydraulic chamber receiving the introduced hydraulic pressure, and thereafter follow up movement of the adjacent sealed surface of the expanding pipe at the same rate at which the pipe metal permanently deforms circumferentially, means through which hydraulic pressure in introduced to the seals for inflating same, and a plurality of circumferentially overlapped backing ring segments carried by each plug end portion in a manner engaged with the seal at that end so as to expand and contract in conjoint radial movement in the same direction and with that seal to prevent the latter from hydraulic extrusion in another direction in the pipe.

7. Apparatus for hydraulically expanding metal pipe comprising a spool type plug member receivable within a section of the pipe, a mantle closable about that section of the pipe, said mantle having a bore the diameter of the finished pipe and greater than the initial diameter of the pipe to be expanded, said plug member having its opposite end portions spaced apart across a relieved center section thereof a distance which is a submultiple of the length of the pipe, and being of a fixed length unitary construction, seal inflating conduit means and further means by which hydraulic fluid is introduced through said center section into the space thereabout between said opposite end portions of the plug, backing rings carried by the opposite end portions of the plug member and each constituted by segmental portions which circumferentially separate from one another by a limited amount enabling the ring to expand, and internally inflatable expansible seals connected with the fluid inside said seal inflating conduit means and adapted for follow-up movement with respect to the adjacent surface of the expanding pipe upon sealing same and at the same rate at which the pipe metal permanently deforms circumferentially, said seals disposed between each end of the spool member and the adjacent backing ring, each of said seals and the adjacent backing ring having interfitting means for causing a companion radial movement of the segmental portions when the seals expand under internal inflation in the same direction therewith to sealingly engage the pipe.

8. Apparatus for hydraulically expanding metal pipe comprising a fixed length, unitary construction, spool type plug member receivable within a section of the pipe, a mantle closable about that section of the pipe, said mantle having a bore the diameter of the finished pipe and greater than the initial diameter of the pipe to be expanded, backing plates carried by the opposite end portions of the plug member and each comprising radially shiftable segmental portions which circumferentially separate a limited amount enabling the backing plate to expand, means through which hydraulic fluid is introduced into the space between the opposite end portions of the plug member, seal inflating conduit means, and internally inflatable expansible seals connected with the fluid inside the seal inflating conduit means and adapted for follow-up movement with respect to the adjacent surface of the expanding pipe upon sealing same and at the same rate at which the pipe metal permanently deforms circumferentially, said seals being internally inflatable seals disposed between each end of the spool member and the adjacent backing plate, each of said seals and the adjacent backing plate having ring and groove portions interfitting with one another for causing a companion radial movement of the segmental portions of the backing plates when the seals expand under internal inflation.

9. Combined means for expanding and hydraulically testing pipe for leaks comprising an elongated member having a body portion and an extreme end portion, said body portion having sealed, leak testing spool structure means thereon spaced apart from one another a predetermined distance corresponding to the nominal length of the pipe, said extreme end portion having second sealed spool structure means thereon spaced apart from one another a distance which is a fractional part of said predetermined distance and being aligned in tandem with said leak testing structure means, mantle means having a length dimension substantially coextensive with the fractional distance aforesaid and transversely aligned with the second spool structures so as to engage the outside of the pipe, means for coaxially introducing said pipe by successive sections over said spool structures on the end portion of said member in the direction of said body portion, means through which hydraulic working fluid is internally admitted to the sealed space between the second spool structure means and the successive sections of the pipe for hydraulically expanding each section in turn against the mantle means for ultimate reception over the leak testing structures, and means through which hydraulic testing fluid is admitted to the sealed space between the leak testing spool structure means in the pipe when the full length of the latter following its full expansion has progressed to a position of reception upon the leak testing spool structure means.

10. For use with a relatively short mantle having a bore the diameter of a finished pipe and larger than the initial diameter of a pipe to be expanded, apparatus for hydraulically cold expanding and testing that pipe comprising in combination an expanding and testing member receivable within the pipe, said member and said pipe being relatively movable in successive stages for telescopically interfitting with one another, means for introducing hydraulic pressure mounted to said member for locally internally stressing relatively short portions of said pipe corresponding to said mantle length for expanding the same to said larger diameter within said mantle at successive stages along the length thereof, and separate hydraulically pressurizable leak testing means mounted to said member for generally internally stressing the entire length of pipe following the total of the local expansions of the individual portions thereof.

11. In a method for cold treating pipe as it is being finished and utilizing a pipe mantle having a bore corresponding to the diameter of the finished pipe, but greater than the initial diameter of the pipe to be cold-worked so as to be permanently hydraulically deformed thereagainst, the improved steps comprising providing unitary structure consisting of a tester mandrel with a short expander spool extension on the outer end thereof, said mandrel and said spool each carrying pipe seals of dimensions such that the existing bore of the pipe will at least be sufficient to receive said spool irrespective of the existing bore being initially unsized with respect to the tester mandrel over which it is to pass, relatively moving the structure and the pipe telescopically into relationship whereby the spool extension takes an inserted position with the immediate front portion of the pipe thereover and within said mantle, sealing and hydraulically expanding said immediate front portion by means of said expander spool into permanent deformation against the mantle, repeating said relative movement, sealing, and expansion steps successively with the next front portion, etc. running from front to rear for the length of the pipe, and thereafter upon final intermittent relative movement following expansion of the rear end portion, test pressurizing the expanded pipe length in situ prior to removal in order to locate leaks.

12. In apparatus of the character described, a bed, an elongated member pivoted at one end to the bed and extending lengthwise thereof, a plurality of seal-carrying spool means common to said member in a tandem arrangement in combination therewith to receive pipes to be treated on said member, a plurality of end clamps on said bed and individually engageable at different times to hold an individual pipe in a plurality of lengthwise adjusted clamped positions on said bed, means including a power-driven roller means for rolling said pipe endwise between those positions in the direction of the pivot axis of said elongated member, and means spaced from the pivot axis of the elongated member and engageable with said elongated member to position the unpivoted end thereof to a point of supported alignment with the oncoming pipe.

13. As an article of manufacture, an elongated member for use in apparatus of the character described and having separate conduits therein for the passage of fluid under differing pressures therethrough, a plurality of seal-carrying spool means common to said member in a tandem arrangement in combination therewith to receive tubular parts to be expanded and tested on said member, said seals consisting of at least a number of hollow seals, means communicatively connecting the hollow interior of one of said hollow seals and the space between it and the next spool means to different ones of said conduits to maintain the former at separate pressures from one another, and means communicatively connected to another of said conduits to produce a third pressure in the space between two other seal-carrying spool means aforesaid.

References Cited in the file of this patent

UNITED STATES PATENTS

| | | |
|---|---|---|
| 410,630 | Ashworth | Sept. 10, 1889 |
| 1,879,009 | Anthony | Sept. 27, 1932 |
| 2,344,779 | Kolderman et al. | Mar. 21, 1944 |
| 2,368,928 | King | Feb. 6, 1945 |
| 2,460,580 | Huber | Feb. 1, 1949 |
| 2,481,013 | Henderson | Sept. 6, 1949 |
| 2,667,136 | Reichl et al. | Jan. 26, 1954 |
| 2,671,339 | Krause et al. | Mar. 9, 1954 |
| 2,722,905 | Albers | Nov. 8, 1955 |
| 2,755,661 | Lorant et al. | July 24, 1956 |
| 2,767,795 | Bush | Oct. 23, 1956 |
| 2,780,271 | Ewart et al. | Feb. 5, 1957 |